(12) United States Patent
Marcin et al.

(10) Patent No.: US 11,014,151 B2
(45) Date of Patent: *May 25, 2021

(54) METHOD OF MAKING AIRFOILS

(71) Applicant: United Technologies Corporation, Farmington, CT (US)

(72) Inventors: John Joseph Marcin, Marlborough, CT (US); Mark F. Zelesky, Bolton, CT (US); Joel H. Wagner, Wethersfield, CT (US); Theodore W. Hall, Berlin, CT (US); David A. Krause, Tolland, CT (US); Ben S. Reinert, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/705,003

(22) Filed: Dec. 5, 2019

(65) Prior Publication Data

US 2020/0276637 A1 Sep. 3, 2020

Related U.S. Application Data

(62) Division of application No. 15/473,403, filed on Mar. 29, 2017, now Pat. No. 10,556,269.

(51) Int. Cl.
*B22C 9/10* (2006.01)
*B22C 9/12* (2006.01)
(Continued)

(52) U.S. Cl.
CPC ............... *B22D 25/02* (2013.01); *B22C 3/00* (2013.01); *B22C 7/02* (2013.01); *B22C 9/04* (2013.01);
(Continued)

(58) Field of Classification Search
CPC .... B22C 3/00; B22C 7/00; B22C 7/02; B22C 9/04; B22C 9/10; B22C 9/103;
(Continued)

(56) References Cited

U.S. PATENT DOCUMENTS 5,824,250 A 10/1998 Whalen et al.
6,443,213 B1 9/2002 Graham et al.
(Continued)

FOREIGN PATENT DOCUMENTS

EP 1153681 A1 11/2001
JP 2004082206 A 3/2004
(Continued)

OTHER PUBLICATIONS

Communication Pursuant to Article 94(3) EPC for European Application No. 18164387.5, dated Jun. 18, 2019, 3 pages.
(Continued)

*Primary Examiner* — Kevin P Kerns
(74) *Attorney, Agent, or Firm* — Kinney & Lange, P.A.

(57) ABSTRACT

A method of making an airfoil includes making a refractory metal core that defines an interior of the airfoil by a tomo-lithographic process, making a mold that defines an exterior of the airfoil, inserting the refractory metal core into the mold, and pouring an airfoil material between the refractory metal core and the mold to cast the airfoil.

10 Claims, 6 Drawing Sheets

(51) Int. Cl.
| | |
|---|---|
| *B22C 9/24* | (2006.01) |
| *B22C 9/04* | (2006.01) |
| *B22D 25/02* | (2006.01) |
| *B22D 29/00* | (2006.01) |
| *B22C 3/00* | (2006.01) |
| *B22C 7/02* | (2006.01) |
| *B22F 3/10* | (2006.01) |
| *B22F 3/24* | (2006.01) |
| *B22F 7/04* | (2006.01) |
| *B23K 1/00* | (2006.01) |
| *B23K 1/19* | (2006.01) |
| *B23K 103/12* | (2006.01) |
| *F01D 5/18* | (2006.01) |
| *F01D 9/02* | (2006.01) |
| *F01D 25/12* | (2006.01) |
| *F04D 29/32* | (2006.01) |
| *F04D 29/54* | (2006.01) |
| *F04D 29/58* | (2006.01) |

(52) U.S. Cl.
CPC ............ *B22C 9/103* (2013.01); *B22C 9/108* (2013.01); *B22C 9/12* (2013.01); *B22C 9/24* (2013.01); *B22D 29/002* (2013.01); *B22F 3/1017* (2013.01); *B22F 3/24* (2013.01); *B22F 7/04* (2013.01); *B23K 1/0008* (2013.01); *B23K 1/19* (2013.01); *B22F 2301/20* (2013.01); *B22F 2998/10* (2013.01); *B23K 2103/12* (2018.08); *F01D 5/18* (2013.01); *F01D 9/02* (2013.01); *F01D 25/12* (2013.01); *F04D 29/324* (2013.01); *F04D 29/542* (2013.01); *F04D 29/582* (2013.01); *F05D 2220/32* (2013.01)

(58) Field of Classification Search
CPC .. B22C 9/108; B22C 9/12; B22C 9/24; B22D 25/02; B22D 29/00; B22D 29/002
USPC ................ 164/23, 28, 30, 516, 45, 369, 137
See application file for complete search history.

(56) References Cited

U.S. PATENT DOCUMENTS

| | | | |
|---|---|---|---|
| 6,637,500 | B2 | 10/2003 | Shah et al. |
| 6,889,747 | B2 | 5/2005 | Graham |
| 6,913,064 | B2 * | 7/2005 | Beals etal. ................ B22C 9/10 164/369 |
| 7,108,045 | B2 | 9/2006 | Wiedemer et al. |
| 7,141,812 | B2 | 11/2006 | Appleby et al. |
| 7,410,606 | B2 | 8/2008 | Appleby et al. |
| 7,411,204 | B2 | 8/2008 | Appleby et al. |
| 7,438,118 | B2 | 10/2008 | Santeler |
| 7,448,428 | B2 | 11/2008 | Graham et al. |
| 7,575,039 | B2 | 8/2009 | Beals et al. |
| 7,624,787 | B2 | 12/2009 | Lee et al. |
| 7,780,905 | B2 | 8/2010 | Dodds |
| 7,861,766 | B2 | 1/2011 | Bochiechio et al. |
| 7,905,273 | B2 | 3/2011 | Dodds et al. |
| 7,913,743 | B2 | 3/2011 | Bedzyk |
| 7,958,928 | B2 | 6/2011 | Garlock et al. |
| 8,056,607 | B2 | 11/2011 | Garlock et al. |
| 8,091,610 | B2 | 1/2012 | Graham et al. |
| 8,196,640 | B1 | 6/2012 | Paulus et al. |
| 8,317,475 | B1 | 11/2012 | Downs |
| 8,678,771 | B2 | 3/2014 | Merrill et al. |
| 9,038,700 | B2 | 5/2015 | Dube et al. |
| 9,208,917 | B2 | 12/2015 | Appleby et al. |
| 9,272,324 | B2 | 3/2016 | Merrill et al. |
| 9,315,663 | B2 | 4/2016 | Appleby et al. |
| 9,486,854 | B2 | 11/2016 | Propheter-Hinckley |
| 10,556,269 | B1 * | 2/2020 | Marcin etal. ............. B22C 9/10 |
| 10,596,621 | B1 * | 3/2020 | Marcin etal. ............. B22F 3/10 |
| 2006/0086478 | A1 | 4/2006 | Persky et al. |
| 2007/0084581 | A1 | 4/2007 | Graham et al. |
| 2009/0056902 | A1 | 3/2009 | Dodds et al. |
| 2009/0224441 | A1 | 9/2009 | Dodds |
| 2011/0135263 | A1 | 6/2011 | Molin et al. |
| 2013/0052415 | A1 | 2/2013 | Burns et al. |
| 2013/0139990 | A1 | 6/2013 | Appleby et al. |
| 2013/0280093 | A1 | 10/2013 | Zelesky et al. |
| 2013/0341822 | A1 | 12/2013 | Ellgass et al. |
| 2016/0003056 | A1 | 1/2016 | Xu |
| 2016/0151829 | A1 | 6/2016 | Propheter-Hinckley et al. |
| 2016/0222790 | A1 | 8/2016 | Spangler |
| 2017/0113265 | A1 | 4/2017 | Slavens et al. |

FOREIGN PATENT DOCUMENTS

| | | |
|---|---|---|
| WO | 2009094012 A2 | 7/2009 |
| WO | 2011050025 A2 | 4/2011 |
| WO | 2011070557 A2 | 6/2011 |
| WO | 2011071974 A2 | 6/2011 |
| WO | 2017160303 A1 | 9/2017 |

OTHER PUBLICATIONS

Partial European Search Report dated Jun. 25, 2018, received for corresponding European Application No. 18164387.5, 14 pages.
Extended European Search Report dated Jun. 25, 2018, received for corresponding European Application No. 18163906.3.
Extended European Search Report dated Oct. 9, 2018, received for corresponding European Application No. 18164387.5.
Appleby, Michael et al., "Tomo-Lithographic-Molding (TLM)—A Breakthrough Manufacturing Process for Large Area Micro-Mechanical Systems," Mikro Systems, Inc., Dec. 20, 2017, 5 pages.
Non-Final Office Action received for U.S. Appl. No. 16/819,534, dated Sep. 28, 2020, 10 pages.

* cited by examiner

METHOD OF MAKING AIRFOILS

CROSS-REFERENCE TO RELATED APPLICATION(S)

This application is a divisional of U.S. Pat. No. 10,556,269, filed Mar. 29, 2017, entitled "Apparatus for and Method of Making Multi-Walled Passages in Components" by John Joseph Marcin, Mark F. Zelesky, Joel H. Wagner, Theodore W. Hall, David A. Krause, and Ben S. Reinert, the disclosure of which is incorporated by reference herein in its entirety.

BACKGROUND

The present disclosure relates to casting cores, and in particular to investment casting cores which are formed at least in part from refractory metals made by a tomo-lithographic manufacturing process.

Investment casting is a commonly used technique for forming metallic components having complex geometries, especially hollow components, and is used in the fabrication of superalloy gas turbine engine components (i.e. components comprised of materials such as, for example, single-crystal PWA1480, single-crystal PWA1484, columnar grain PWA1422, columnar grain PWA1426, and other nickel-base alloys). Gas turbine engines are widely used in aircraft propulsion, electric power generation, and ship propulsion. In all gas turbine engine applications, efficiency is a prime objective.

Improved gas turbine engine efficiency can be obtained by operating at higher temperatures, however current operating temperatures are at such a level that, in the turbine section, the superalloy materials used have limited mechanical properties. Consequently, it is a general practice to provide air cooling for components in the hottest portions of gas turbine engines, typically in the turbine section. Cooling is provided by flowing relatively cool air from the compressor section of the engine through passages in the turbine components to be cooled. It will be appreciated that cooling comes with an associated cost in engine efficiency, consequently, there is a strong desire to provide enhanced specific cooling, maximizing the amount of cooling benefit obtained from a given amount of cooling air.

Referring to FIG. 1, a gas turbine engine 10 includes a compressor 12, a combustor 14, and a turbine 16. Air 18 flows axially through the sections 12, 14, and 16 of the engine 10. As is well known in the art, air 18, compressed in the compressor 12, is mixed with fuel which is burned in the combustor 14 and expanded in the turbine 16, thereby rotating the turbine 16 and driving the compressor 12.

Both the compressor 12 and the turbine 16 are comprised of rotating and stationary airfoils 20, 22, respectively. The airfoils, especially those disposed in the turbine 16, are subjected to repetitive thermal cycling under widely ranging temperatures and pressures. To avoid thermal damage to the airfoils, each airfoil 20 includes internal cooling.

Referring to FIG. 2, the airfoil 20 includes a leading edge 26 and a trailing edge 28 extending from a root end 30 to a tip 32 thereof and a platform 34. A leading edge cooling passage 40 is formed within the leading edge 26 of the airfoil 20 having radially extending, connected channels 42-44 and a leading edge inlet 46, formed within the platform 34 and in fluid communication with the channel 42. A plurality of leading edge crossover holes 48 formed within a leading edge passage wall 50 separating the channel 44 from a leading edge exhaust passage 52, allow the cooling air from the channel 44 to flow into the leading edge exhaust passage 52. A trailing edge cooling passage 56 is formed within the trailing edge 28 of the airfoil 20 having radially extending connected channels 58-60 and a trailing edge inlet 62 formed within the platform 34 and in fluid communication with the channel 58. A first plurality of trailing edge crossover holes 66 is formed within a first trailing edge wall 68 and a second plurality of trailing edge crossover holes 72 is formed within a second trailing edge wall 74 to allow cooling air from channel 58 to flow through an intermediate passage 78 to a plurality of trailing edge slots 80.

A ceramic core 120, as depicted in FIGS. 3 and 4, is used in the manufacturing process of the airfoils 20 and defines the hollow cavities therein. A ceramic core leading edge 126 and a ceramic core trailing edge 128 correspond to the leading edge 26 and trailing edge 28 in the airfoil 20, respectively. A ceramic core root 130 and a tip 132 correspond to the airfoil root 30 and tip 32, respectively. Ceramic core passages 140, 156 with channels 142-144, 158-160, and inlets 146, 162 respectively, correspond to passages 40, 56 with channels 42-44, 58-60 and inlets 46, 62, of the airfoil, respectively. Passages 52 and 78 of the airfoil correspond to channels 152 and 178 in the ceramic core. Pluralities of fingers 148, 166, 172 in the core 120 correspond to the plurality of crossover holes 48, 66, 72 in the airfoil 20, respectively. A core tip 190 is attached to the core passages 140, 156 by means of fingers 182-185, to stabilize the core 120 at the tip 132. An external ceramic handle 194 is attached at the core trailing edge 128 for handling purposes. A core extension 196 defines a cooling passage at the root to the airfoil 20. Centerlines 197-199 extend radially through each row of fingers 148, 166, 172, respectively.

While turbine blades and vanes are some of the most important components that are cooled, other components such as combustion chambers and blade outer air seals also require cooling, and such components (and in fact all complex cast articles) can include similar structures to those shown in FIG. 2 and be made using ceramic cores with general similarities to those shown in FIGS. 3 and 4.

Conventionally, cores such as that shown in FIGS. 3 and 4 are fabricated from ceramic materials but such ceramic cores are fragile, especially the advanced cores used to fabricate small intricate cooling passages in advanced hardware. Current ceramic cores are prone to warpage and fracture during fabrication and during casting. In some advanced experimental blade designs casting yields of less than 10% are achieved, principally because of core failure.

Conventional ceramic cores are produced by a molding process using a ceramic slurry and a shaped die (not shown); both injection molding and transfer-molding techniques may be employed. The pattern material is most commonly wax although plastics, low melting-point metals, and organic compounds such as urea, have also been employed. The shell mold (not shown) is formed using a colloidal silica binder to bind together ceramic particles which may be alumina, silica, zirconia, and alumina silicates.

The investment casting process to produce a turbine blade, using a ceramic core, will be explained briefly here (although it is not depicted in any of the figures). A ceramic core having the geometry desired for the internal cooling passages is placed in a metal die whose walls surround but are generally spaced away from the core. The die is filled with a disposable pattern material such as wax. The die is removed leaving the ceramic core embedded in a wax pattern. The outer shell mold is then formed about the wax pattern by dipping the pattern in a ceramic slurry and then applying larger, dry ceramic particles to the slurry. This process is termed stuccoing. The stuccoed wax pattern, containing the core, is then dried and the stuccoing process repeated to provide the desired shell mold wall thickness. At this point the mold is thoroughly dried and heated to an elevated temperature to remove the wax material and strengthen the ceramic material.

The result is a ceramic mold containing a ceramic core which in combination define a mold cavity. It will be understood that the exterior of the core defines the passageway to be formed in the casting and the interior of the shell mold defines the external dimensions of the superalloy casting to be made. The core and shell may also define casting portions such as gates and risers which are necessary for the casting process but are not a part of the finished cast component.

After the removal of the wax, molten superalloy material is poured into the cavity defined by the shell mold and core assembly and solidified. The mold and core are than removed from the superalloy casting by a combination of mechanical and chemical means.

SUMMARY

According to one embodiment, a method of making an airfoil includes making a refractory metal core that defines an interior of the airfoil by a tomo-lithographic process, making a mold that defines an exterior of the airfoil, inserting the refractory metal core into the mold, and pouring an airfoil material between the refractory metal core and the mold to cast the airfoil.

DETAILED DESCRIPTION

Figure 1:
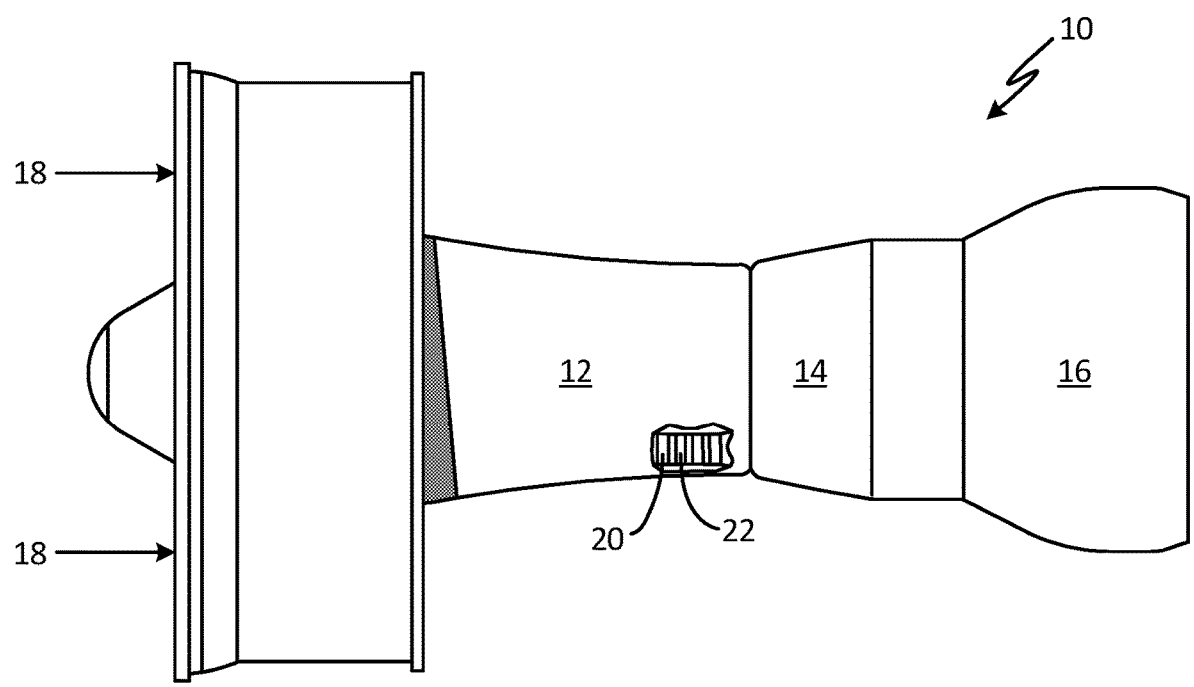
FIG. 1 is a simplified, broken away elevation view of a gas turbine engine.
Figure 2:
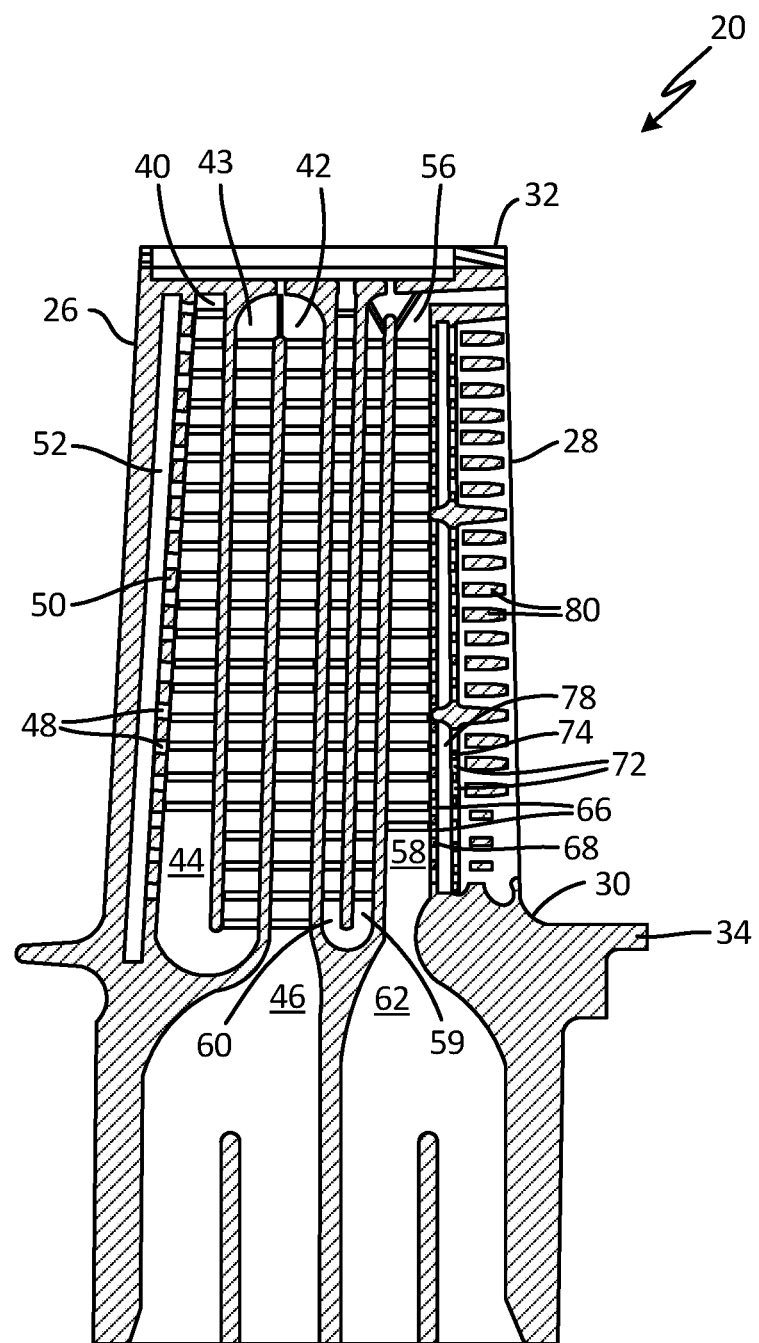
FIG. 2 is an enlarged, cross-sectional elevation view of an airfoil of the gas turbine engine of FIG. 1.
Figure 3:
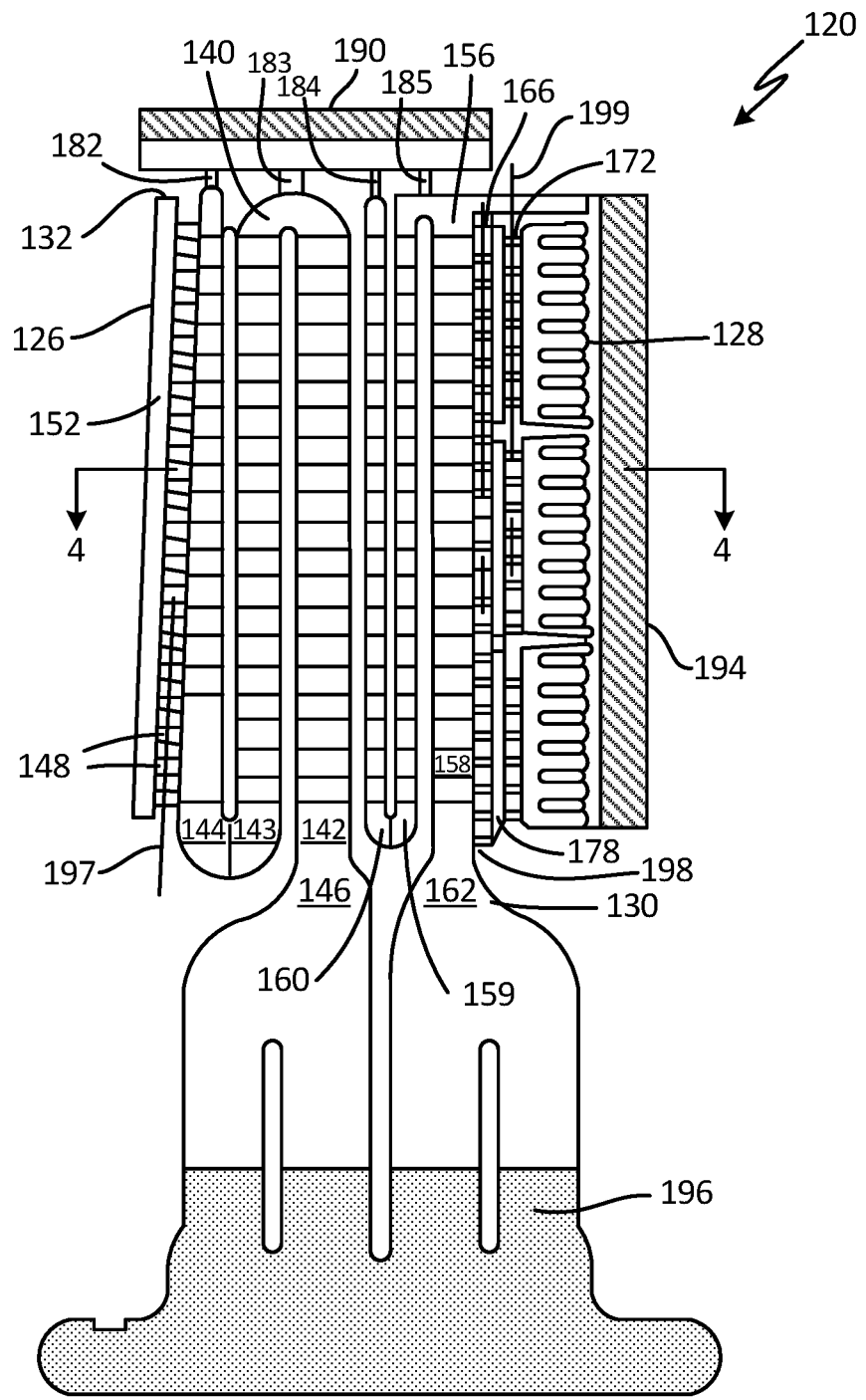
FIG. 3 is an elevation view of a ceramic core defining cooling passages for manufacturing of the airfoil of FIG. 2.
Figure 4:
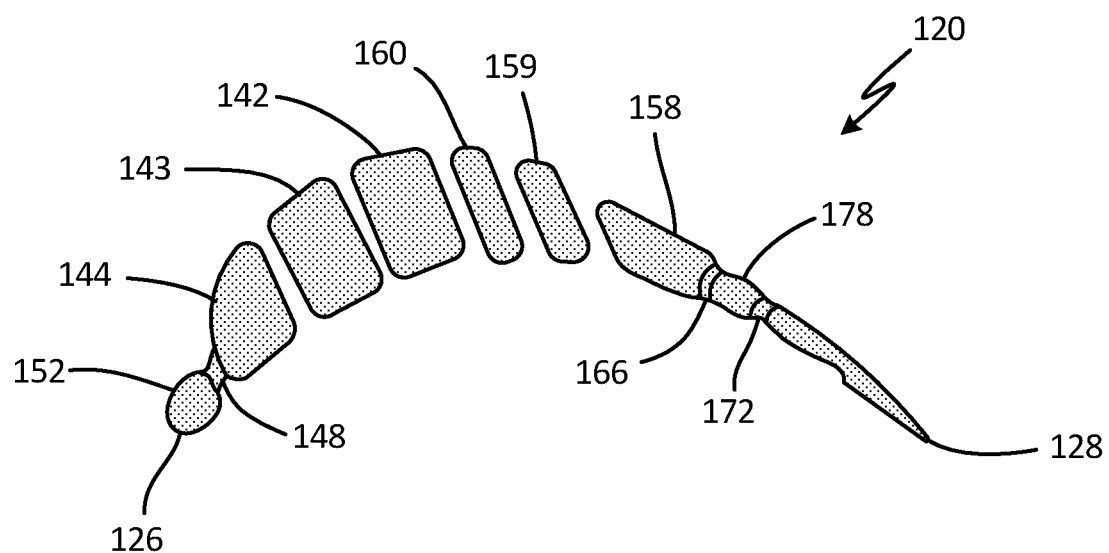
FIG. 4 is a cross-sectional elevation view of the ceramic core taken in the direction of section line 4-4 in FIG. 3.
Figure 5:
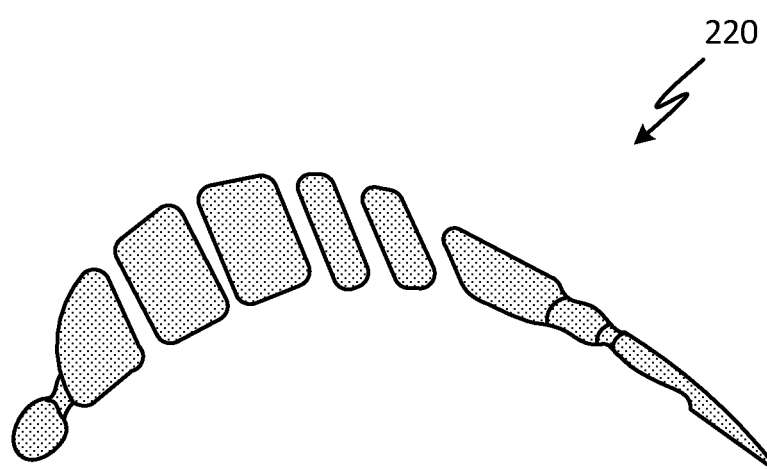
FIG. 5 shows a cross sectional elevation view of an alternate embodiment refractory metal core taken in the direction of section line 4-4 in FIG. 3.

As previously noted, conventional ceramic cores are currently a limiting factor in the design of advanced complex superalloy articles because they impose dimensional limitations on casting design. FIG. 5 shows the cross sectional elevation as in FIG. 4, although FIG. 5 depicts alternate embodiment core 220 which is comprised of a refractory metal material. Refractory metals include, for example, molybdenum, tantalum, niobium, tungsten, and alloys thereof. In general, refractory metals are stronger and tougher than ceramic materials, so refractory metals are better able to survive the casting process. In addition, refractory metals possess higher melting points than the base alloy to be cast and can be formed by a variety of methods into standard shapes.

Refractory metals are generally prone to oxidize at elevated temperatures and are also somewhat soluble in molten superalloys. Accordingly, refractory metal cores can be given a protective coating to prevent oxidation and erosion by molten metal. Refractory metal core elements can be coated with one or more thin continuous adherent ceramic layers for protection. Suitable ceramics include silica, alumina, zirconia, chromia, mullite, and hafnia. Preferably, the coefficient of thermal expansion of the refractory metal and the ceramic are similar. Ceramic layers may be applied, for example, by chemical vapor deposition, physical vapor deposition, electrophoresis, and sol gel techniques. Multiple layers of different ceramics can also be employed, and individual layers can typically be 0.0025 mm to 0.025 mm (0.1 in. to 1 in.) thick. In addition, metallic layers of platinum, other noble metals, chromium and aluminum may be applied to the refractory metal elements for oxidation protection, in combination with a ceramic coating for protection from molten metal erosion.

Refractory metal alloys and intermetallics such as molybdenum alloys, tungsten alloys, tantalum alloys, niobium alloys, and molybdenum disilicide ($MoSi_2$), respectively, which form protective silicon dioxide ($SiO_2$) layers can also be employed. Such materials are expected to allow good adherence of a non-reactive oxides such as alumina. It is understood that silica though an oxide is very reactive in the presence of nickel based alloys and must be coated with a thin layer of other non-reactive oxide. However, by the same token silica readily diffusion bonds with other oxides such as alumina forming mullite.

For the present purposes, metals containing solid solution strengtheners, precipitation strengtheners and dispersion strengtheners are classed as alloys. Alloys of molybdenum, for example, include TZM (0.5% titanium, 0.08% zirconium, 0.04% carbon, with the balance being molybdenum), and lanthanated molybdenum alloys of tungsten include, for example, tungsten-rhenium (62% W and 38% Re).

After the casting process is complete the shell and core are removed. The shell is external and can be removed by mechanical means to break the ceramic away from the casting, followed as necessary by chemical means usually involving immersion in a caustic solution (possibly under conditions of elevated temperatures and pressures in an autoclave). The refractory metal core can be removed from superalloy castings by acid treatments. For example, molybdenum cores can be removed from a nickel superalloy using 40 parts nitric acid ($HNO_3$), 30 parts sulfuric acid ($H_2SO_4$), with the balance being water ($H_2O$) at temperatures of 60° C. to 100° C. In addition for refractory metal cores of relatively large cross sectional dimensions, thermal oxidation can be used to remove molybdenum which forms a volatile oxide.

Figure 6:
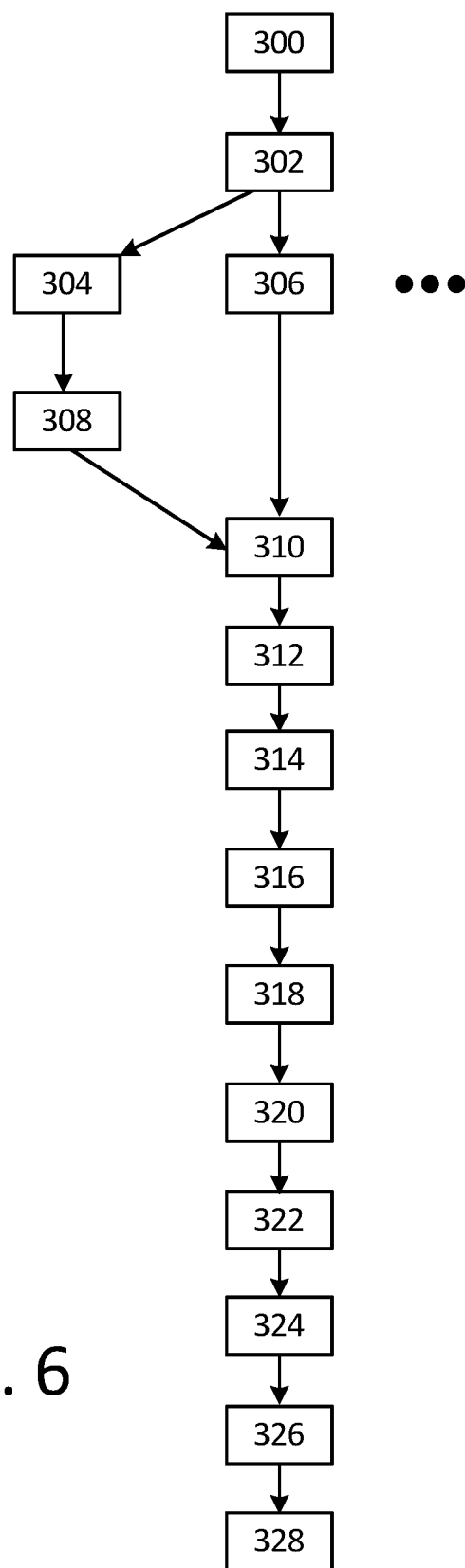
FIG. 6 is a flowchart of a method for making the refractory metal core of FIG. 5 using a tomo-lithographic process.

FIG. 6 is a flowchart of a method for making refractory metal core 220 using a tomo-lithographic process. At step 300, a computer model is generated of core 220, which can be accomplished by analyzing the empty spaces within airfoil 20 either physically or by using a computer model of airfoil 20. At step 302, the computer model is digitally sliced into discrete digital layers. The thickness of each layer can be, for example, about 0.08 mm (0.003 in.), although the layers can have the same or different thicknesses depending on, for example, the desired surface finish and/or the size of the features of core 220.

At step 304, a first metal foil is formed to correspond to the first layer of the computer model. The metal foil can be made of, for example, a copper material or any material that can be masked and selectively etched, machined, and/or attacked. The forming can be done using photolithography and/or another precision material removal process such as, for example, photo-etching, controlled depth etching, laser machining, reactive ion etching, electroplating, vapor deposition, bulk micro-machining, surface micro-machining, and/or conventional machining. At step 306, a second metal foil is formed to correspond to the second layer of the computer model. Step 306 can be performed contemporaneously with step 304. As indicated by the ellipsis in FIG. 6, as many metal foil layers can be made as is necessary to physically represent all of the digital layers of the computer model, although, for the sake of simplicity, only the first two layers will be discussed specifically. At step 308, the first layer is aligned with and placed on a fixture. At step 310, a film of bonding material that is one or more orders of magnitude thinner than the thickness of the first or second layers is applied to at least one of the first and second layers. This bonding material can be, for example, braze paste or adhesive. At step 312, the second layer is aligned with and placed on the fixture on top of the first layer. At step 314, the second layer is affixed to the first layer. The step of affixation can occur, for example, by compression of the layers, by the application of heat, by the removal of heat, by allowing escape of volatile organic compounds, and/or by allowing the passage of time. The result is a lamination master pattern which is physical copy of the computer model of core 220. In an alternative embodiment, the master pattern of the core shape can be created from other additive and/or subtractive technologies directly from a computer model or directly machined from another metallic or ceramic material.

At step 316, the lamination master pattern is encased in a suitable flexible molding material such as a root temperature vulcanizing (RTV) silicone rubber. Once the flexible molding material cures, possibly in a vacuum chamber, this new flexible mold is removed from the lamination master pattern at step 318 in at least two pieces. At step 320, the flexible mold is reassembled, and a mixture of refractory metal pulverulent and a binder is mixed to achieve a specific consistency and fluidity and then poured or injected into the flexible mold at step 322. The binder can be organic or inorganic in nature or a mixture of both for example, metal, crosslinkable polymers such as epoxy, silicone (e.g., polysiloxane, in particular polydimethylsiloxane), polyimides, epoxysilanes, phenolics, polyurethanes, polysilsesquioxanes, paraffin filled or nonfilled with plastic constituent, urethane, epoxy, and colloidal silica, ceramic, organic matrix composites, and other hybrid materials. The flexible mold can be backed with metal that is contoured to the shape of the flexible mold to provide additional rigidity which can help during the mold filling process. After the binder is sufficiently activated to harden the refractory core, the flexible mold is removed from the refractory core at step 324. The refractory core is still in the green state at step 324, and, at step 326, the refractory metal is sintered to consolidate and harden the refractory core, forming core 220. Also at or before step 326, the binder can be removed using chemical, thermal, and/or mechanical methods to dissolve, degrade, divide, melt, burn, and/or otherwise destroy the binder. Such methods can include the application of acids, bases, radiation, heat, and/or cold to the refractory core. The sintering is performed in an environment that is sufficiently devoid of oxygen, for example, in an inert or vacuum environment, to prevent oxidation or atmospheric attack of the refractory metal. This sintering can be performed with the refractory core supported by loose inert powder or by encasing the individual cores into inert "setters" to ensure dimensional conformance of core 220. At step 328, core 220 is coated with a ceramic material.

At this point, core 220 is ready to be inserted into a mold of the exterior surfaces of airfoil 20 so that superalloy material can be poured between the exterior mold and core 220 to form airfoil 20. Several refractory metal cores can be combined to form intricate single or multiple wall castings. Refractory metal cores can also be combined with ceramic cores to make single or double wall components. Because of the inherent precision of the two-dimensional layer creation process that is used to create each layer of the lamination master pattern, core 220 has tighter tolerances than if core 220 were machined from a single piece of material. In addition, because core 220 is made from refractory metal material(s), core 220 is stronger than ceramic core 120 and is more likely to survive the casting process to produce a correct airfoil 20.

Discussion of Possible Embodiments

The following are non-exclusive descriptions of possible embodiments of the present invention.

A method of making a refractory metal core according to an exemplary embodiment of this disclosure, among other possible things includes: forming a first layer of the refractory metal core out of a first material; forming a second layer of the refractory metal core out of the first material; bonding the first and second layers together to form a laminate master pattern; forming a flexible mold around the laminate master pattern; removing the laminate master pattern from the flexible mold; pouring a pulverulent refractory metal material into the flexible mold; and sintering the pulverulent refractory metal material to form the refractory metal core.

The method of the preceding paragraph can optionally include, additionally and/or alternatively, any one or more of the following features, configurations and/or additional components:

A further embodiment of the foregoing method, wherein the first material can comprise copper.

A further embodiment of any of the foregoing methods, wherein the pulverulent refractory metal material can comprise one of the following materials: molybdenum, tantalum, niobium, and tungsten.

A further embodiment of any of the foregoing methods, wherein the method can further comprise: coating the refractory metal core with a ceramic coating.

A further embodiment of any of the foregoing methods, wherein the ceramic coating can comprise one of the following materials: silica, alumina, zirconia, chromia, mullite, and hafnia.

A further embodiment of any of the foregoing methods, wherein the method can further comprise: generating a computer model of the refractory metal core; and slicing the computer model into a plurality of digital layers.

A further embodiment of any of the foregoing methods, wherein the first and second layers can be formed to match two of the plurality of digital layers.

A further embodiment of any of the foregoing methods, wherein the method can further comprise: analyzing a plurality of empty spaces in an airfoil to generate the computer model of the refractory metal core.

A further embodiment of any of the foregoing methods, wherein bonding the first and second layers together can comprise brazing the first and second layers together.

A further embodiment of any of the foregoing methods, wherein bonding the first and second layers together can comprise adhering the first and second layers together.

A method of making an airfoil according to an exemplary embodiment of this disclosure, among other possible things includes: making a refractory metal core that defines an interior of the airfoil by a tomo-lithographic process; making a mold that defines an exterior of the airfoil; inserting the refractory metal core into the mold; and pouring an airfoil material between the refractory metal core and the mold to cast the airfoil.

The method of the preceding paragraph can optionally include, additionally and/or alternatively, any one or more of the following features, configurations and/or additional components:

A further embodiment of the foregoing method, wherein the method can further comprise: removing the mold from the airfoil; and removing the core from the airfoil.

A further embodiment of any of the foregoing methods, wherein removing the core from the airfoil can comprise applying an acid treatment.

A further embodiment of any of the foregoing methods, wherein the method can further comprise: applying a ceramic coating to the refractory metal core prior to pouring the airfoil material.

A further embodiment of any of the foregoing methods, wherein the refractory metal core can comprise one of the following materials: molybdenum, tantalum, niobium, or tungsten.

A further embodiment of any of the foregoing methods, wherein the tomo-lithographic process can comprise: forming a first layer of the refractory metal core out of a first material; forming a second layer of the refractory metal core out of the first material; bonding the first and second layers together to form a laminate master pattern; forming a flexible mold around the laminate master pattern; removing the laminate master pattern from the flexible mold; pouring a pulverulent refractory metal material mixed with a binder into the flexible mold; and sintering the pulverulent refractory metal material in an oxygen-free environment to form the refractory metal core.

A further embodiment of any of the foregoing methods, wherein the method can further comprise: applying a metallic layer to the refractory metal core.

A further embodiment of any of the foregoing methods, wherein the metallic layer comprises platinum, another noble metal, chromium, and/or aluminum.

A further embodiment of any of the foregoing methods, wherein the method can further comprise: generating a computer model of the refractory metal core; slicing the computer model into a plurality of digital layers; and analyzing a plurality of empty spaces in an airfoil to generate the computer model of the refractory metal core.

A further embodiment of any of the foregoing methods, wherein the method can further comprise: placing the refractory metal core into a wax injection die; placing a ceramic core into the wax injection die; encapsulating the refractory metal core and the ceramic core with a wax material to form a first wax pattern; assembling a first wax pattern with a second wax pattern to form a wax assembly; investing the wax assembly into a wet ceramic slurry mix; investing the wax assembly into a dry ceramic stucco with intermittent controlled drying to build up a thickness of ceramic shell on the exterior of the assembly; drying the thickness of ceramic shell; and removing the wax material from the ceramic shell.

A further embodiment of any of the foregoing methods, wherein the method can further comprise: firing the ceramic shell in an oxygen-free environment; cleaning the ceramic shell; casting a component in the ceramic shell; removing the ceramic shell from the component; removing the ceramic core with a caustic solution that is heated and under pressure; and removing the refractory metal core with an acid solution.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of making an airfoil, the method comprising:
   making a refractory metal core that defines an interior of the airfoil by a tomo-lithographic process, wherein the tomo-lithographic process comprises:
      forming a first layer of the refractory metal core out of a first material;
      forming a second layer of the refractory metal core out of the first material;
      bonding the first and second layers together to form a laminate master pattern;
      forming a flexible mold around the laminate master pattern;
      removing the laminate master pattern from the flexible mold;
      pouring a pulverulent refractory metal material mixed with a binder into the flexible mold; and
      sintering the pulverulent refractory metal material in an oxygen-free environment to form the refractory metal core;
   making a mold that defines an exterior of the airfoil;
   inserting the refractory metal core into the mold; and
   pouring an airfoil material between the refractory metal core and the mold to cast the airfoil.

2. The method of claim 1, further comprising:
   removing the airfoil from the mold; and
   removing the core from the airfoil.

3. The method of claim 2, wherein removing the core from the airfoil comprises applying an acid treatment.

4. The method of claim 1, further comprising:
   applying a ceramic coating to the refractory metal core prior to pouring the airfoil material.

5. The method of claim 4, further comprising:
   applying a metallic layer to the refractory metal core.

6. The method of claim 5, wherein the metallic layer comprises platinum, another noble metal, chromium, and/or aluminum.

7. The method of claim 1, wherein the refractory metal core comprises one of the following materials: molybdenum, tantalum, niobium, or tungsten.

8. The method of claim 1, further comprising:
   generating a computer model of the refractory metal core;
   slicing the computer model into a plurality of digital layers; and
   analyzing a plurality of empty spaces in an airfoil to generate the computer model of the refractory metal core.

9. The method of claim 1, further comprising:
   placing the refractory metal core into a wax injection die;
   placing a ceramic core into the wax injection die;
   encapsulating the refractory metal core and the ceramic core with a wax material to form a first wax pattern;
   assembling a first wax pattern with a second wax pattern to form a wax assembly;
   investing the wax assembly into a wet ceramic slurry mix;
   investing the wax assembly into a dry ceramic stucco with intermittent controlled drying to build up a thickness of ceramic shell on the exterior of the assembly;
   drying the thickness of ceramic shell; and
   removing the wax material from the ceramic shell.

10. The method of claim 9, further comprising:
firing the ceramic shell in an oxygen-free environment;
cleaning the ceramic shell;
casting a component in the ceramic shell;
removing the ceramic shell from the component;
removing the ceramic core with a caustic solution that is heated and under pressure; and
removing the refractory metal core with an acid solution.

\* \* \* \* \*